Feb. 26, 1929.
J. M. CLINGER
1,703,709
HAND CONTROLLER FOR MOTOR STARTERS
Filed Nov. 25, 1927
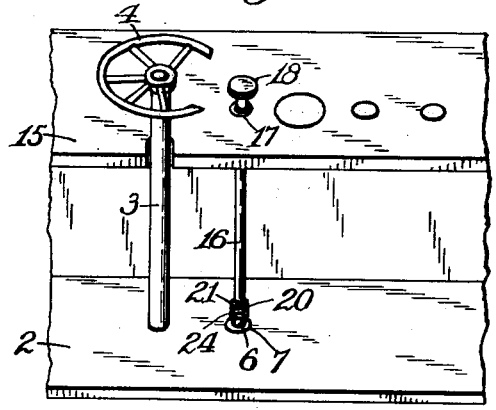
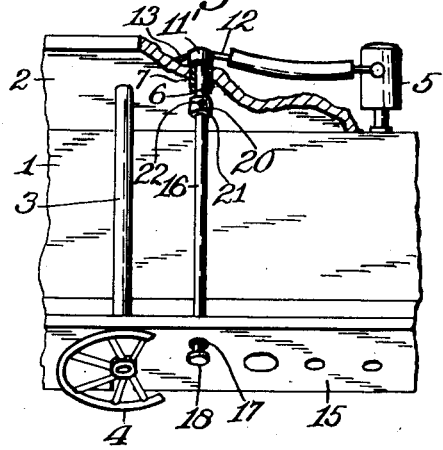
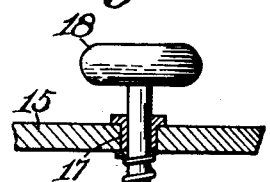
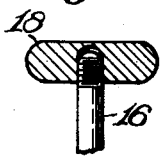
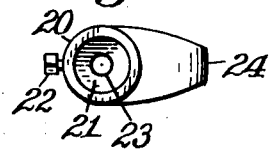
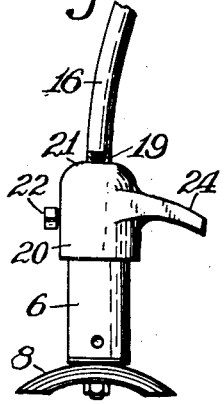
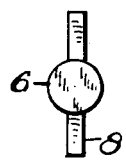
INVENTOR:
Joseph M. Clinger,
BY E. T. Silvius,
ATTORNEY.

Patented Feb. 26, 1929.

1,703,709

UNITED STATES PATENT OFFICE.

JOSEPH M. CLINGER, OF INDIANAPOLIS, INDIANA.

HAND CONTROLLER FOR MOTOR STARTERS.

Application filed November 25, 1927. Serial No. 235,486.

This invention relates to an appliance that is designed to be connected with the electrical starter switch comprising a part of the equipment of some types of automobiles to control the operation of the usual electric starter motor, the invention having reference more particularly to the control of electric switches having a foot-operated plunger located on the inclined portion or foot-board of an automobile floor, and to means whereby such plunger may be conveniently operated and controlled by hand.

An object of the invention is to provide means whereby an automobile driver handicapped by defective feet or legs may control or operate the starter switch by hand, when the switch controller is originally out of reach by hand and located on the floor where it may not be reached with precision by the foot of the driver, especially when in emergency it becomes necessary to start a stalled engine, as when an automobile stops in ascending a hill.

Another object is to provide a hand-controller for motor starters that shall be of simple and inexpensive structure and adapted to be connected with an automobile instrument board so as to be readily accessible by hand, and adapted to operate a conventional foot plunger whereby to close an electric starter circuit promptly and reliably, and which shall be durable and economical in use.

With the above-mentioned and other objects in view, the invention consists in a push-rod adapted to be guided by an instrument board and provided with an adapter-coupling whereby the push-rod is secured to a switch-operating plunger whether the axis of the plunger intersects the instrument board or has different degree of angularity with respect thereto; the invention consisting also further in the parts and combinations and arrangements of parts as hereinafter particularly described and claimed.

Referring to the accompanying drawings,—Figure 1 is a fragmentary view of an inclined instrument board and the conventional foot-board or inclined portion of the automobile floor, the horizontal portion of the floor being omitted, the position of the steering column relatively to the instrument board being indicated, the parts being seen from the driver's position; Fig. 2 is a top plan of the automobile floor with its inclined portion and the instrument board, the invention being illustrated in connection with the instrument board and the switch plunger on the foot-board; Fig. 3 is a sectional detail on an enlarged scale showing the hand-controller as applied to a suitable switch plunger; Figs. 4 and 5 are detail views of parts of the appliance; Fig. 6 is a side view of the switch plunger and a part of the improvement applied thereto; and Fig. 7 is a top plan of the switch and its operating plunger.

Similar reference characters in the different figures of the drawings indicate corresponding elements or features of construction herein referred to in detail.

The fragmentary parts illustrated will readily be recognized as those with which automobile makers and drivers are familiar, the illustrations comprising only the features of an automobile with which the invention is associated, being the body floor 1 of an automobile including the inclined portion or foot-board 2, the conventional steering column 3 and steering wheel 4, a conventional starter motor 5 which is controlled by a suitable electric switch having a switch-operating plunger 6 arranged in the foot-board 2 to be operated by foot pressure when it is desired to start operation of the internal combustion engine of the popular automobile. The electric switch and connections may be variously constructed, a type of suitable construction being shown for the purpose of illustrating and describing the functions of the invention.

For practically operating and guiding the plunger 6 an annular guide 7 is placed on the plunger and secured in a suitable opening in the foot-board 2, the axis of the plunger usually coinciding with a line approximately parallel to the steering column and located in proximity to one side thereof. A suitable switch bar 8 is carried by the plunger to be moved into contact with two electric contact studs 9 and 10 suitably supported with proper insulation by a yoke 11 or a casing 11', a circuit wire 12 being connected with one of the studs and also the starter motor 5 and another circuit wire 13 being connected with the opposite one of the studs and suitably grounded electrically as may be desired. A main spring 14 is seated in the yoke and holds up the plunger to a suitable stop device to prevent unintentional contact of the switch bar with the studs, the strength of the spring offering suitable resistance to foot pressure when operated by the driver's foot to close the electric circuit.

When the physical condition of the driver is such that his feet are shifted with difficulty or cannot conveniently be placed on the switch-operating plunger, it is important to be enabled to operate the plunger by hand by means of a suitable device at the front of the instrument board 15; and, in carrying out the objects of invention a push-rod 16 is provided which is of suitable length to extend through the instrument board, a suitable aperture being made in the board to receive it at a short distance from the steering column, preferably being in alinement with the plunger when the plunger is set at a suitable angle for the purpose, a suitable guide bushing 17 preferably being inserted in the aperture and serving as an anti-rattler device, the bushing preferably being composed of rubber composition. The upper end of the push-rod is provided with a suitable handle, preferably in the form of a knob 18 screw-threaded to secure it to the push-rod. The lower portion of the push-rod has screw threads 19 thereon whereby to rigidly secure an adapter-coupling thereto.

A novel adapter-coupling is provided which comprises a main or socket portion 20 to receive the upper portion of the plunger 6, and a head portion 21 affording a cap to bear upon the top of the plunger, the annular side wall of the socket portion having a setscrew 22 therein to engage the plunger whereby to rigidly secure the parts together. The head portion has a hole bored therein which is provided with screw threads 23 to be engaged by the screw threads 19. In some cases the hole may be in alinement with the axis of the plunger, in other cases the hole is bored angularly to the socket bore, depending upon the setting of the plunger, to permit the push-rod to be guided conveniently in the instrument board. In order to permit the plunger to be operated at will by foot pressure the adapter-coupler is provided externally with a foot pedal projection 24.

Since the resistance of the spring 14 may be so strong as to be difficult to overcome by hand pressure, a coil spring 25 preferably is arranged on the push-rod and seated on the under or rear side of the instrument board and against a pin 26 driven through a suitable hole in the push-rod, a washer 27 being placed between the pin and the spring, the washer being of suitable thickness to give the spring desired tension so that it shall assist in the overcoming of resistance of the main spring when slight hand pressure is exerted on the push-rod handle to operate the electric switch. Washers of different thicknesses may readily be applied for adjusting the tension of the spring.

In practical use the driver may place his foot upon the projection 24 to operate the plunger 6, or he may operate the plunger by hand applied to the handle of the push-rod, as may be most convenient. In case it becomes necessary to promptly start the automobile engine when the driver's feet can not conveniently be shifted from the conventional clutch pedal and brake pedal, the starter switch is promptly operated by hand and with precision.

What is claimed is:

1. A hand-controller for motor starters including a push-rod having a knob fixed on one end and an adapter-coupling removably secured to the opposite end thereof, the adapter-coupling having a socket on its end and also a foot-pedal projection on its side, the socket having a set-screw in its side.

2. A hand-controller for motor starters comprising a push-rod, a knob secured on one end of the push-rod, an adapter-coupling having a socket bore in one end thereof and a hole in the opposite end thereof, at an angle to the bore receiving and holding the opposite end of the push-rod, the hole and the push-rod being screw-threaded.

3. In a motor starter controller, the combination with a switch-operating plunger to be operated by foot-pressure, of a push-rod for hand-operation to be guided adjacent to one end thereof and an adapter-coupling secured to the opposite end of the push-rod and also to said plunger and having a foot-pedal projection on its outer side.

4. In a motor starter controller, the combination of an adapter-coupling comprising a circular wall and a head portion, the head portion having a screw-threaded hole therein, a set-screw in said wall, a push-rod having a screw-threaded portion at one end inserted in said hole, a handle fixedly connected to the opposite end of the push-rod, and an anti-rattling device on the push-rod in proximity to the handle to co-operate with a guide for the push-rod.

5. In a motor starter controller, the combination of a switch-operating plunger and an electric switch bar thereon, a guide for the plunger, contact devices to be engaged by the switch bar upon downward movement of the plunger, a main spring opposing the downward movement of the plunger, a push-rod connected to the plunger for hand-operation, a guide for the push-rod, and a weaker spring adjustably connected to the push-rod to co-operate with the push-rod guide and assist in moving the plunger downward by hand-power.

6. An automobile starter circuit closing attachment comprising a rod alined with the starter button and extending through the automobile dash, a hollow cap on said rod adapted to fit the button of a starter circuit closer, a head on the upper end of the rod above the dash, means for limiting upward movement of said rod, and a flange extending peripherally from the cap for engagement by the foot of an operator.

In testimony whereof, I affix my signature on the 18th day of November, 1927.

JOSEPH M. CLINGER.